United States Patent
Ohmori (10) Patent No.: US 9,091,241 B2
(45) Date of Patent: Jul. 28, 2015

(54) IN-CYLINDER INJECTION TYPE MULTICYLINDER INTERNAL COMBUSTION ENGINE

(75) Inventor: Kenichi Ohmori, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 607 days.

(21) Appl. No.: 12/711,642

(22) Filed: Feb. 24, 2010

(65) Prior Publication Data

US 2010/0229830 A1 Sep. 16, 2010

(30) Foreign Application Priority Data

Mar. 10, 2009 (JP) .................................. 2009-057078

(51) Int. Cl.
| | |
|---|---|
| F02M 69/04 | (2006.01) |
| F02M 67/02 | (2006.01) |
| F02M 69/10 | (2006.01) |
| F02M 69/08 | (2006.01) |
| F02B 23/10 | (2006.01) |

(52) U.S. Cl.
CPC ............ *F02M 69/047* (2013.01); *F02B 23/101* (2013.01); *F02M 67/02* (2013.01); *F02M 69/08* (2013.01); *F02M 69/10* (2013.01); *Y02T 10/125* (2013.01)

(58) Field of Classification Search
CPC ....... F02M 67/02; F02M 69/08; F02M 69/10; F02M 69/047; F02B 23/101; Y02T 23/101
USPC .................................................. 123/445, 533
See application file for complete search history.

(56) References Cited

U.S. PATENT DOCUMENTS

| | | | | | |
|---|---|---|---|---|---|
| 1,149,142 | A | * | 8/1915 | Hornor ..................... | 123/51 BB |
| 2,048,243 | A | * | 7/1936 | Zoller ......................... | 123/51 B |
| 2,080,846 | A | * | 5/1937 | Alfaro ......................... | 123/51 B |
| 3,766,894 | A | * | 10/1973 | Mize ........................... | 123/52.5 |
| 3,923,019 | A | * | 12/1975 | Yamada .................. | 123/51 BA |
| 4,079,705 | A | * | 3/1978 | Buchner ................... | 123/51 B |
| 4,288,326 | A | * | 9/1981 | Keefer ....................... | 210/637 |
| 4,290,394 | A | * | 9/1981 | Frank et al. .............. | 123/73 A |
| 4,296,714 | A | * | 10/1981 | Buchner ................... | 123/51 BB |
| 4,352,345 | A | * | 10/1982 | Menard et al. ........... | 123/406.58 |

(Continued)

FOREIGN PATENT DOCUMENTS

| | | |
|---|---|---|
| JP | 2004-340046 A | 12/2004 |
| JP | 2005-299454 A | 10/2005 |
| JP | 4135912 B2 | 6/2008 |

*Primary Examiner* — Hieu T Vo
*Assistant Examiner* — Sherman Manley
(74) *Attorney, Agent, or Firm* — Birch, Stewart, Kolasch & Birch, LLP (57) ABSTRACT

In an in-cylinder injection type multicylinder internal combustion engine for uneven interval firing, including a plurality of air-fuel mixture injection valves for directly injecting an air-fuel mixture into a combustion chamber of each cylinder, the air-fuel mixture injection valves being mounted on a multicylinder engine body and each having a fuel injection valve and an air injection valve, and an air pump actuatable by power transmitted from a crankshaft for discharging compressed air. The air pump is connected in common to the air-fuel mixture injection valves with the injection pressure of the air-fuel mixture injection valves in each cylinder being prevented from changing for good combustibility. The discharge timing of the air pump is set out of synchronism with the injection timings of the fuel injection valves and the air injection valves of all the cylinders.

13 Claims, 6 Drawing Sheets

(56) References Cited

U.S. PATENT DOCUMENTS

| | | | |
|---|---|---|---|
| 5,027,778 A * | 7/1991 | Nogi et al. | 123/472 |
| 5,148,788 A * | 9/1992 | Saikalis et al. | 123/339.27 |
| 5,979,413 A * | 11/1999 | Ohnuma et al. | 123/491 |
| 6,629,650 B2 * | 10/2003 | Curran et al. | 239/585.1 |
| 6,920,861 B2 * | 7/2005 | Hayakawa et al. | 123/295 |
| 6,955,161 B2 * | 10/2005 | Suzuki et al. | 123/533 |
| 7,219,634 B2 * | 5/2007 | Hitomi et al. | 123/58.8 |
| 7,252,076 B2 * | 8/2007 | Cho | 123/533 |
| 7,331,331 B2 * | 2/2008 | Hanawa et al. | 123/470 |
| 7,370,643 B2 * | 5/2008 | Hanawa | 123/531 |

* cited by examiner

IN-CYLINDER INJECTION TYPE MULTICYLINDER INTERNAL COMBUSTION ENGINE

CROSS-REFERENCE TO RELATED APPLICATIONS

The present application claims priority under 35 USC 119 to Japanese Patent Application No. 2009-057078 filed on Mar. 10, 2009 the entire contents of which are hereby incorporated by reference.

BACKGROUND OF THE INVENTION

1. Field of the Invention

The present invention relates to an in-cylinder injection type multicylinder internal combustion engine for uneven interval firing, including a plurality of air-fuel mixture injection valves for directly injecting an air-fuel mixture into a combustion chamber of each cylinder. The air-fuel mixture injection valves is mounted on a multicylinder engine body and each having a fuel injection valve for injecting fuel and an air injection valve for injecting a mixture of the fuel injected from fuel injection valve and injection air. An air pump is actuatable by power transmitted from a crankshaft for discharging compressed air as the injection air. The air pump is connected in common to the air-fuel mixture injection valves.

2. Description of Background Art

An in-cylinder injection type internal combustion engine is known in which an air-fuel mixture injection valve is provided for directly injecting an air-fuel mixture into a combustion chamber. The air-fuel mixture injection valve includes a fuel injection valve for injecting fuel and an air injection valve for injecting a mixture of the fuel injected from fuel injection valve and injection air that are mounted in a cylinder head. See, for example Japanese Patent No. 4135912.

Japanese Patent No. 4135912 discloses the injection timings of a fuel injection valve and an air injection valve with the valves constructing the air-fuel mixture injection valve in a single-cylinder internal combustion engine. If the injection timings are applied to a multicylinder internal combustion engine for uneven interval firing, then the discharge timing of the air pump tends to overlap the injection timing of the fuel injection valve or the air injection valve of either one of the cylinders, possibly causing a change in the injection pressure of the fuel injection valve or the air injection valve.

SUMMARY AND OBJECTS OF THE INVENTION

According to an embodiment of the present invention, a multicylinder internal combustion engine is provided for uneven interval firing, which prevents the injection pressure of a fuel injection valve or an air injection valve of any cylinder from changing for good combustibility.

According to an embodiment of the present invention, an in-cylinder injection type multicylinder internal combustion engine is provided for uneven interval firing, including a plurality of air-fuel mixture injection valves for directly injecting an air-fuel mixture into a combustion chamber of each cylinder. The air-fuel mixture injection valves are mounted on a multicylinder engine body with each having a fuel injection valve for injecting fuel and an air injection valve for injecting a mixture of the fuel injected from the fuel injection valve and the injection air, and an air pump actuatable by power transmitted from a crankshaft for discharging compressed air as the injection air. The air pump is connected in common to the air-fuel mixture injection valves, wherein the air pump has a discharge timing set out of synchronism with injection timings of the fuel injection valves and the air injection valves of all cylinders.

According to an embodiment of the present invention, the engine body has two cylinders, and the discharge timing of the air pump is set after the completion of the injection from the air injection valve of one of the cylinders and before the injection timing of the fuel injection valve of the other cylinder.

According to an embodiment of the present invention, wherein the time after the completion of the injection from the air injection valve of the one of the cylinders until the air pump starts to discharge the air is set to be shorter than the time after the completion of the discharge of the air pump until the fuel injection valve of the other cylinder starts to inject the fuel.

According to an embodiment of the present invention, the discharge timing of the air pump is set immediately after the completion of the injection from the air injection valve of the one of the cylinders.

According to an embodiment of the present invention, the discharge timing of the air pump is set between nearly the top dead center in an exhaust stroke of the other cylinder and nearly the top dead center in a compression stroke of the one of the cylinders.

According to an embodiment of the present invention, since the air pump discharges the air out of synchronism with injection timings of the fuel injection valves and the air injection valves of all cylinders, a change in the injection pressure of the fuel injection valves and the air injection valves, which would be caused by a pressure change in a high-pressure air pipe system due to the discharge from the air pump, is prevented, giving a stable pressure environment to the air-fuel mixture injection valves of the cylinders for good combustibility.

According to an embodiment of the present invention, in a two-cylinder internal combustion engine, since no compressed air is discharged from the air pump between the injection timings of the fuel injection valves and the air injection valves of the cylinders, a change in the injection pressure of the fuel injection valves or the air injection valves, which would be caused by a pressure change based on the discharge of the compressed air from the air pump, is effectively prevented for stable air-fuel mixture injection control.

According to an embodiment of the present invention, the time after the completion of the discharge of the air pump until the injection timing of the fuel injection valve of the other cylinder is increased to reduce a change in the injection pressure not only of the air injection valve but also of the fuel injection valve which serves as part of the air-fuel mixture injection valve. In addition, the range in which the pressure of the pressurized air changes can be reduced by alternately repeating the fuel injection and the air injection, and the discharge from the air pump.

According to an embodiment of the present invention, the time after the completion of the discharge of the air pump until the fuel injection valve of the other cylinder is maximized to reduce more effectively the range in which the injection pressure of the fuel injection valve changes.

According to an embodiment of the present invention, the air pump actuated by the power transmitted from the crankshaft discharges air in the compression stroke of the one of the cylinders, thereby further slowing the slow compression stroke under a load imposed by the discharge from the air pump. Rotational fluctuations are thus increased to emphasize the characteristics of the internal combustion engine for uneven interval firing, so that the riding feeling on a vehicle equipped with the internal combustion engine is improved. It is more effective to set the discharge timing of the air pump in a latter part of the compression stroke of the one of the cylinders.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Embodiments of the present invention will be described below with reference to the accompanying drawings.

Figure 1:
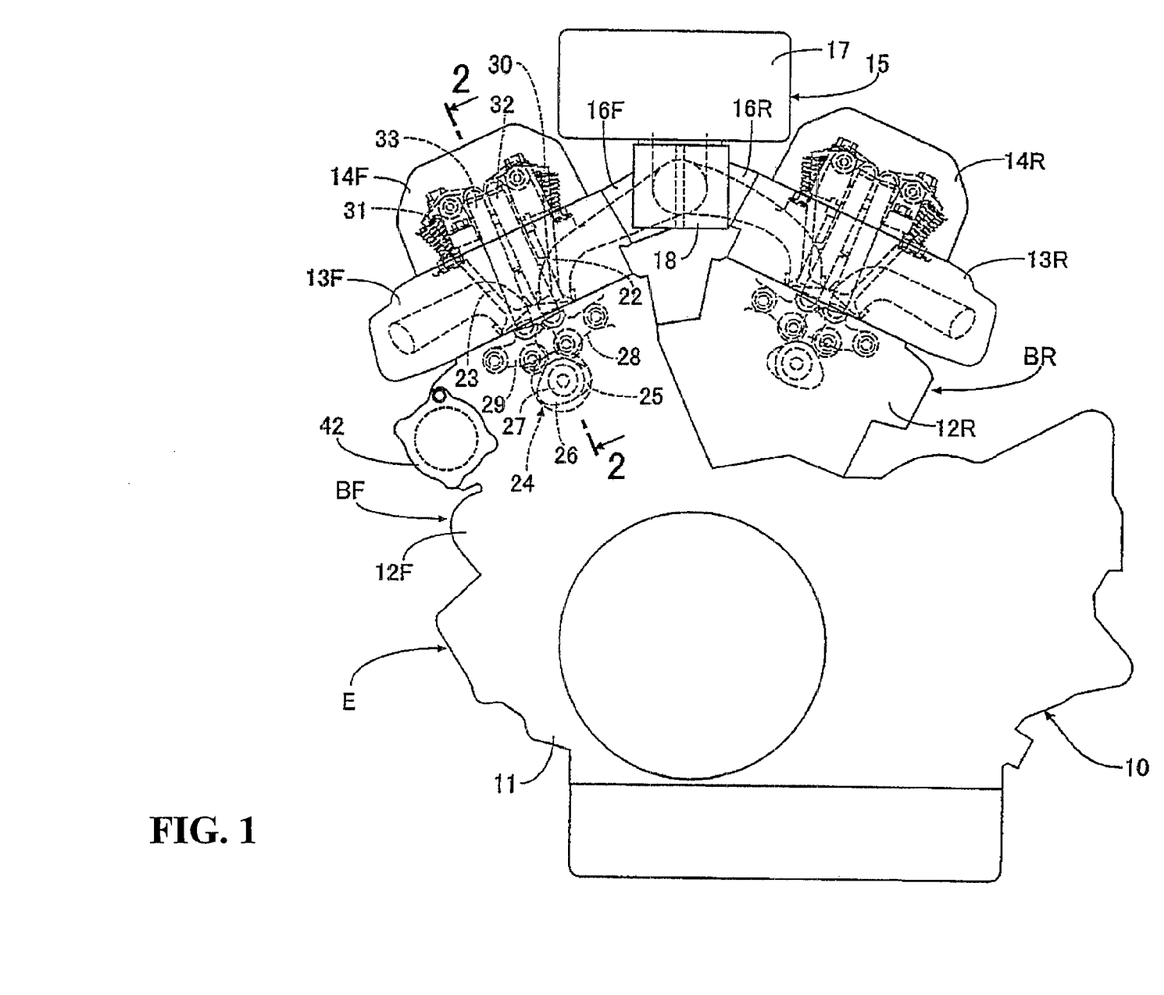
FIG. 1 is a side elevational view of an engine according to Embodiment 1.

Embodiment 1 of the present invention will be described with reference to FIGS. 1 through 5. As shown in FIG. 1, an internal combustion engine E is an in-cylinder injection type multicylinder internal combustion engine for uneven interval firing which includes a front bank BF and a rear bank BR that include V-shaped two cylinders. The internal combustion engine E is mounted on a two-wheeled motorcycle, for example.

The internal combustion engine E has an engine body 10 including a crankcase 11, cylinder blocks 12F and 12R connected in a substantially V shape to the crankcase 11, cylinder heads 13F and 13R connected to respective upper portions of the cylinder blocks 12F and 12R, and head covers 14F and 14R connected to respective upper portions of the cylinder heads 13F and 13R. The front bank BF is constructed of the cylinder block 12F, the cylinder head 13F, and the head cover 14F, and the rear bank RF is constructed of the cylinder block 12R, the cylinder head 13R, and the head cover 14R.

An air intake device 15 is disposed between the banks BF and BR. The air intake device 15 includes intake pipes 16F and 16R connected to respective inner surfaces of the cylinder heads 13F and 13R of the banks BF and BR, an air cleaner 17, and a throttle body 18 disposed between the air cleaner 17 and the intake pipes 16F and 16R, for controlling the rate of air flowing through the intake pipes 16F and 16R.

Figure 2:
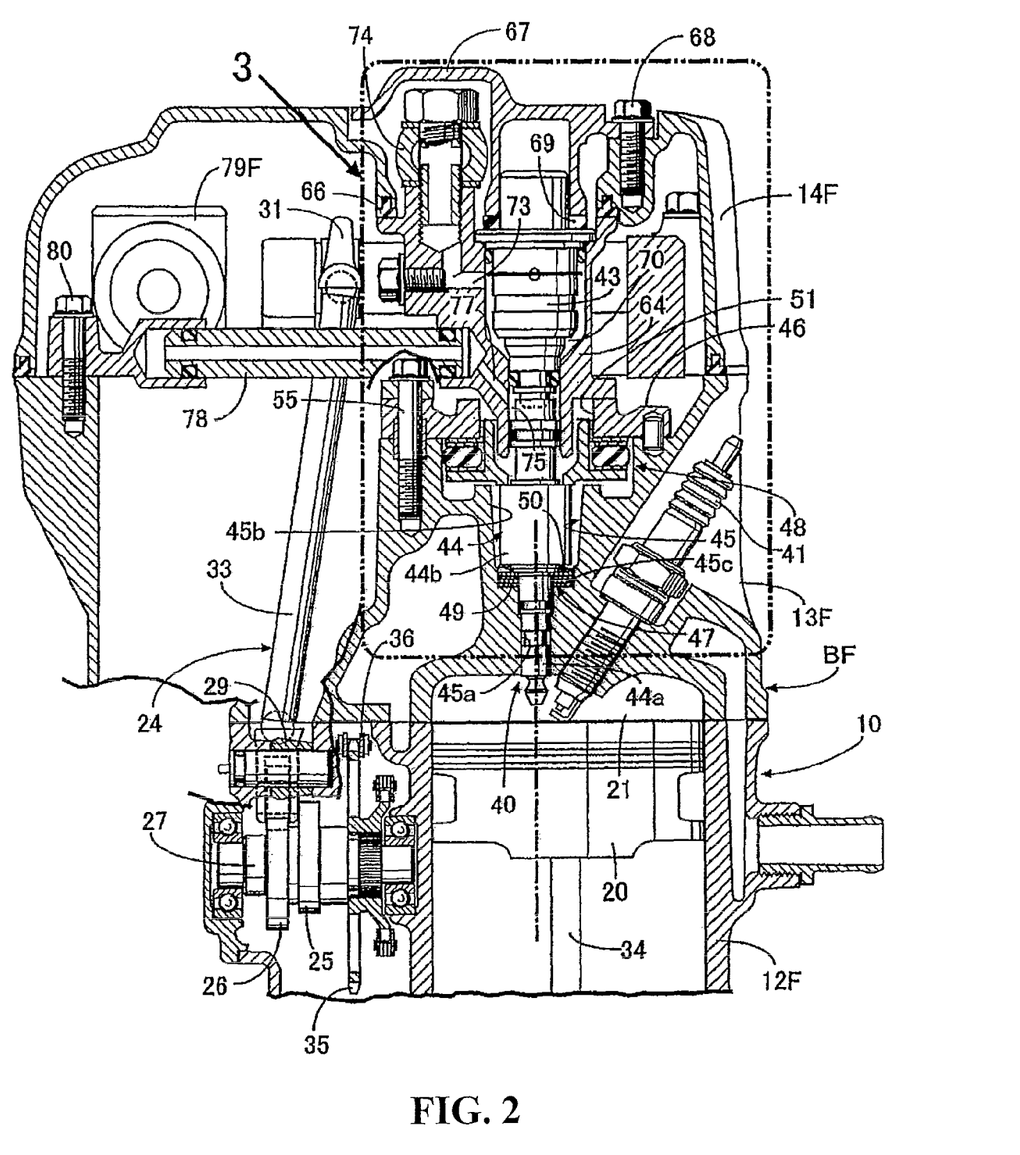
FIG. 2 is a cross-sectional view taken along line 2-2 of FIG. 1.

As also shown in FIG. 2, a combustion chamber 21 which faces the upper end of a piston 20 slidably fitted in the cylinder block 12F is defined between the cylinder block 12F and the cylinder head 13F of the front bank BF. An intake valve 22 (see FIG. 1) for controlling the influx of air from the intake pipe 16F into the combustion chamber 21 and a discharge valve 23 (see FIG. 1) for controlling the discharge of an exhaust gas from the combustion chamber 21 are openably and closably disposed in the cylinder head 13F.

The intake valve 22 and the exhaust valve 23 are opened and closed by a valve operating device 24. The valve operating device 24 includes a camshaft 27 having intake and exhaust cams 25 and 26 and rotatably supported in the cylinder block 12F, an intake first rocker arm 28 swingably driven by the intake cam 25, an exhaust first rocker arm 29 swingably driven by the exhaust cam 26, an intake second rocker arm 30 ganged with and coupled to the intake valve 22, an exhaust second rocker arm 31 ganged with and coupled to the exhaust valve 23, an intake drive rod 32 disposed between the intake first and second rocker arms 28 and 30 for transmitting the swinging motion of the intake first rocker arm 28 to the intake second rocker atm 30, and an exhaust drive rod 33 disposed between the exhaust first and second rocker arms 29 and 31 for transmitting the swinging motion of the exhaust first rocker arm 29 to the exhaust second rocker arm 31.

The camshaft 27 has opposite ends rotatably supported by the cylinder block 12F. The rotational power from a crankshaft (not shown) which is coupled to the piston 20 by a connecting rod 34 and rotatably supported by the crankcase 11 is transmitted at a speed reduced to ½ to the camshaft 27 by a driven sprocket 35 relatively nonrotatably mounted on the camshaft 27, a drive sprocket fixed to the crankshaft, and an endless cam chain 36 trained around the driven sprocket 35 and the drive sprocket.

An air-fuel mixture which includes a fuel and injection air is directly injected into the combustion chamber 21 by an air-fuel mixture injection valve 40 that has an axis parallel to the axis along which the piston 20 operates and is disposed in the cylinder head 13F of the engine body 10 between the intake valve 22 and the exhaust valve 23. An ignition plug 41 for igniting the fuel injected into the combustion chamber 21 is mounted in the cylinder head 13F with its tip end projecting into the combustion chamber 21.

The air-fuel mixture injection valve 40 is supplied with compressed air from an air pump 42 mounted on a front side wall of the cylinder block 12F on its front portion. The air pump 42 is actuated by power transmitted from the crankshaft.

The air-fuel mixture injection valve 40 includes a fuel injection valve 43 mounted in the head cover 14F for injecting fuel and an air injection valve 44 mounted in the cylinder head 13F and coaxially connected to the fuel injection valve 43, for directly injecting the fuel with compressed air into the combustion chamber 21. The air injection valve 44 has a nozzle 44a on an end thereof which projects into the combustion chamber 21 and a large-diameter portion 44b in its axially intermediate portion thereof.

The cylinder head 13F has a mount hole 45 defined therein parallel the axis along which the piston 20 operates. The mount hole 45 includes a small-diameter hole 45a having an end which is open into the combustion chamber 21 and a large-diameter hole 45b having a diameter greater than the small-diameter hole 45a and having an end coaxially joined to the other end of the small-diameter hole 45a with a radially outwardly extending annular step 45c interposed between the large-diameter hole 45b and the small-diameter hole 45a. The air injection valve 44 is inserted into the mount hole 45 from the head cover 14F with the nozzle 44a thereof hermetically fitted in the small-diameter hole 45a. The air injection valve 44 has its large-diameter portion 44b in the axially intermediate portion thereof disposed in the large-diameter hole 45b of the mount hole 45.

The air injection valve 44 is sandwiched between the annular step 45c and a damper cover 46 mounted on the cylinder head 13F. First damper means 47 which has a vibration damping capability is interposed between the annular step 45c and the air injection valve 44, and second damper means 48 which has a vibration damping capability is interposed between the damper cover 46 and the air injection valve 44.

Figure 3:
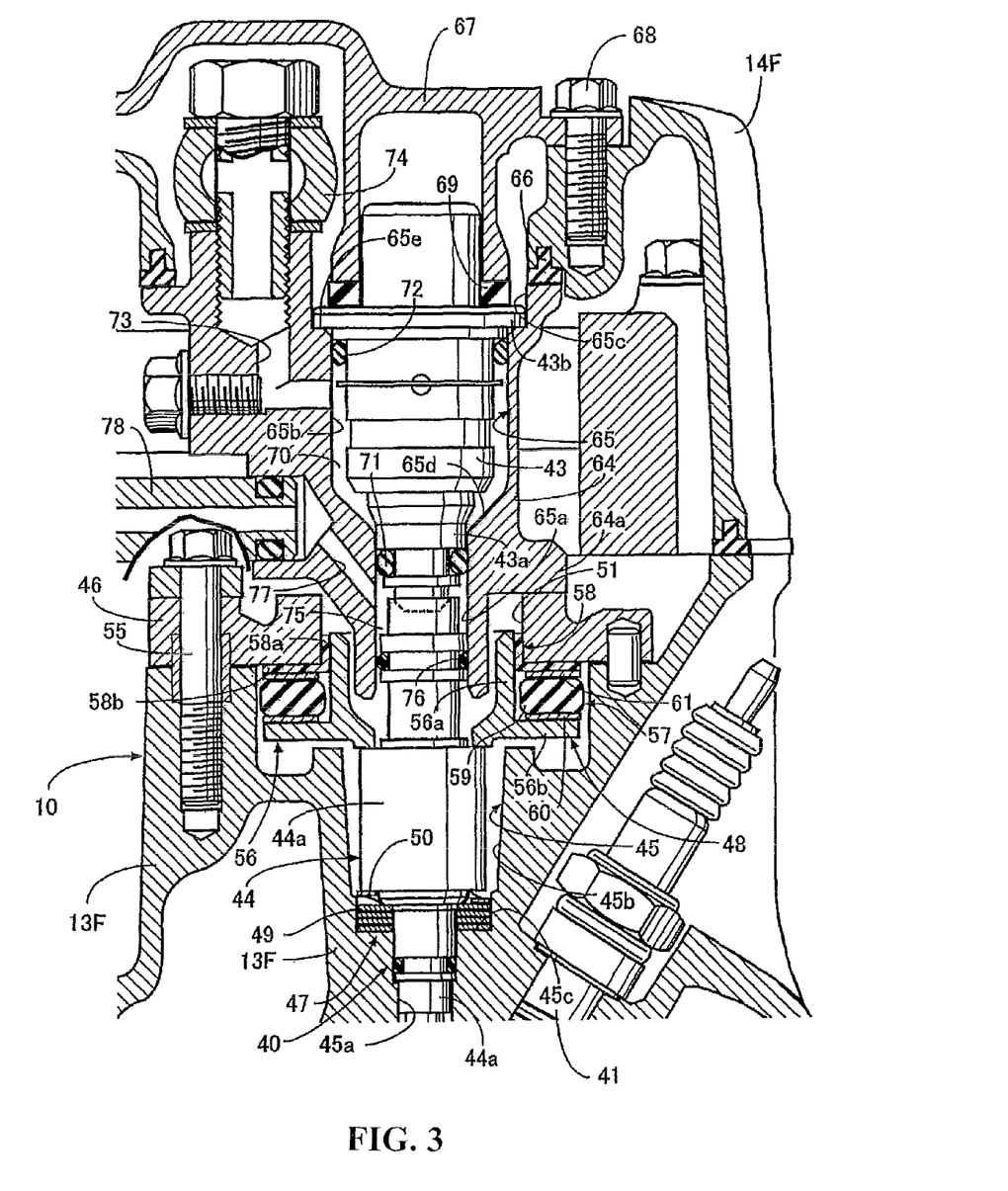
FIG. 3 is an enlarged view of an area indicated by the arrow 3 in FIG. 2.

As also shown in FIG. 3, the first damper means 47 includes a plurality of, e.g., four, vibration damping washers 49 made of vibration damping steel sheet, vibration damping alloy, or the like and a wave washer 50 superposed on the vibration damping washers 49. The first damper means 47 is interposed between the annular step 45c and the lower end of the large-diameter portion 44b of the air injection valve 44.

The damper cover 46 is in the shape of a ring with a central hole 51 defined centrally therein coaxially with the mount hole 45. The damper cover 46 is fastened to cylinder head bosses by bolts 55.

The second damper means 48 includes a damper holder 56 held against the air injection valve 44 from outside of the mount hole 45 and supported on the damper cover 46 for sliding movement along the axis of the mount hole 45, and a damper member 57 held by the damper holder 56 and interposed between the damper holder 56 and the damper cover 46. A collar 58 is mounted on the damper cover 46 for guiding the sliding movement of the damper holder 56 with respect to the damper cover 46 along the axis of the mount hole 45.

The damper holder 56 includes a hollow cylindrical member 56a having a lower end held against the upper end of the large-diameter portion 44b of the air injection valve 44 and an upper portion inserted in the central hole 51 of the damper cover 46 and a flange 56b integral with the hollow cylindrical member 56a and extending radially outwardly from a lower portion of the hollow cylindrical member 56a. The damper holder 56 is made of vibration damping steel, for example. The damper member 57 includes a rubber ring 59 surrounding the hollow cylindrical member 56a of the damper holder 56 and cured between ring-shaped washers 60 and 61 which are made of iron, for example. The resilient force of the wave washer 50 of the first damper means 47 is set to a level lower than the resilient force of the rubber ring 59.

The collar 58, which is made of fluoroplastics, for example, includes a hollow cylindrical member 58a inserted in the central hole 51 of the damper cover 46 and interposed between the hollow cylindrical member 56a of the damper holder 56 and the damper cover 46 and a flange 58b integral with the hollow cylindrical member 58a, extending radially outwardly from the lower end of the hollow cylindrical member 58a, being held against the lower surface of the damper cover 46. The damper member 57 is sandwiched between the flange 56b of the damper holder 56 and the flange 58b of the collar 58 which is held against the damper cover 46.

The other end of the air injection valve 44 is hermetically and slidably fitted in a valve holder 64 which is in a fixed position with respect to the cylinder head 13F. The valve holder 64 has a holding hole 65 defined therein coaxially with the mount hole 45. The holding hole 65 includes a small-diameter hole 65a in which the other end of the air injection valve 44 is hermetically and slidably fitted, a medium-diameter hole 65b greater in diameter than the small-diameter hole 65a, and a large-diameter hole 65c greater in diameter than the medium-diameter hole 65b, the holes 65a, 65b and 65c being coaxially joined together successively upwardly. A tapered step 65d is disposed between the small-diameter hole 65a and the medium-diameter hole 65b, and a radially outwardly extending annular step 65e is disposed between the medium-diameter hole 65b and the large-diameter hole 65c.

The valve holder 64 has a plurality of integral support legs 64a at the lower portion thereof, the legs being held against the damper cover 46 from above. The head cover 14F is held against an upper portion of the valve holder 64 with a gasket 66 interposed therebetween. In other words, the valve holder 64 is sandwiched between the damper cover 46 mounted on the cylinder head 13F and the head cover 14F.

The fuel injection valve 43 is inserted in the holding hole 65. The fuel injection valve 43 has a nozzle 43a on an end thereof, the nozzle being hermetically fitted in the small-diameter portion 65a of the holding hole 65 with its tip end inserted in the other end of the air injection valve 44, and a flange 43b near the other end thereof. The flange is held against the annular step 65e of the holding hole 65. A cover 67 for covering the fuel injection valve 43 from above is fastened to the head cover 14F by a plurality of bolts 68. The cover 67 is held against the flange 43b of the fuel injection valve 43 from above with a gasket 69 interposed therebetween. Therefore, the fuel injection valve 43 is sandwiched between the annular step 65e of the valve holder 64 which is in the fixed position with respect to the cylinder head 13F and the cover 67 fastened to the head cover 14F.

An annular combustion chamber 70 which communicates with the inside of the fuel injection valve 43 is defined between the valve holder 64 and the fuel injection valve 43. The combustion chamber 70 has its axially opposite ends sealed by an annular seal member 71 mounted on the outer circumferential surface of the nozzle 43a in resilient contact with the inner circumferential surface of the small-diameter hole 65a of the holding hole 65 and an annular seal member 72 mounted on the outer circumferential surface of the fuel injection valve 43 in resilient contact with the inner circumferential surface of the medium-diameter hole 65b of the holding hole 65.

The valve holder 64 has a fuel supply passage 73 defined therein which communicates with the fuel chamber 70. A hose for introducing a fuel from a fuel supply source, not shown, is connected to the fuel supply passage 73 by a joint 74.

Between the tip end of the fuel injection valve 43 and the rear end of the air injection valve 44, there is defined a pressurizing air chamber 75 in the valve holder 64 in communication with the other end, i.e., the rear end, of the air injection valve 44. The pressurizing air chamber 75 has axially opposite ends sealed by the seal member 71 mounted on the nozzle 43a of the fuel injection valve 43 and an annular seal member 76 which is mounted on the outer circumferential surface of the air injection valve 44 near the other end thereof and held in resilient contact with the inner circumferential surface of the small-diameter hole 65a of the holding hole 65.

The valve holder 64 has a pressurizing air passage 77 defined therein which communicates with the pressurizing air chamber 75. As shown in FIG. 2, an air pressure regulator 79F for being supplied with compressed air discharged from the air pump 42 is mounted on the cylinder head 13F by bolts 80. An air supply pipe 78 for introducing compressed air whose pressure has been regulated by the air pressure regulator 79F has an end hermetically connected to the air pressure regulator 79F and the other end connected to the valve holder 64 in hermetic communication with the pressurizing air passage 77.

The rear bank BR has a fuel supply structure which is similar to the fuel supply structure of the front bank BF except that it shares the air pump 42 with the front bank BF. Therefore, the fuel supply structure of the rear bank BR will not be described in detail below.

Figure 4:
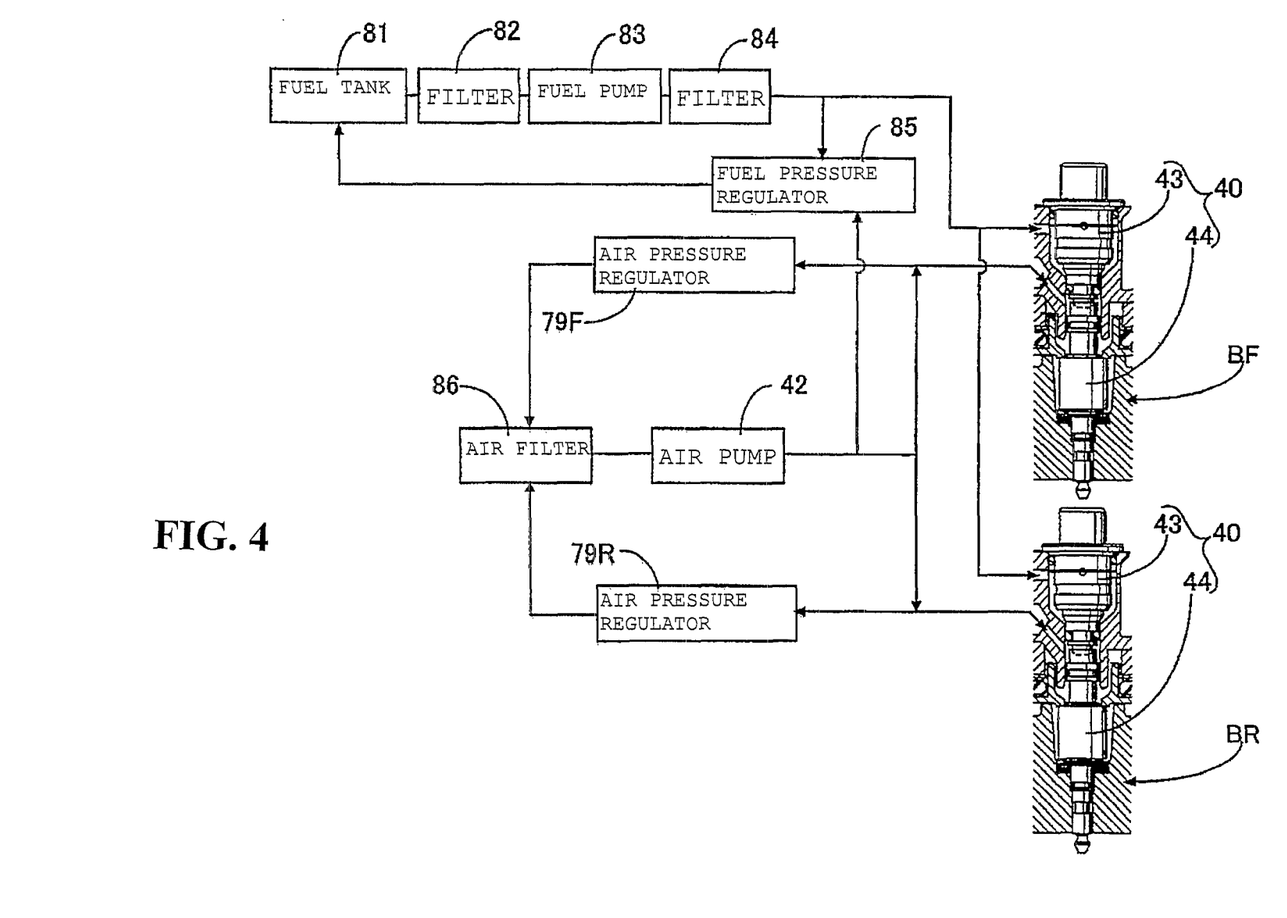
FIG. 4 is a block diagram of a fuel supply system and a compressed air supply system for air-fuel mixture injection valves.

As shown in FIG. 4, a fuel pump 83 whose inlet port is connected to a fuel tank 81 through a filter 82 has an outlet port connected to the fuel injection valves 43 of the air-fuel mixture injection valves 40 of the front and rear banks BF and BR through a filter 84. A fuel pressure regulator 85 for regulating the difference between the fuel pressure and the air pressure to a constant level is connected between the fuel injection valves 43 and the filter 84.

The air pump 42 serves to draw in air which has been purified by an air filter 86. The air pressure from the air pump 42 is supplied to the fuel pressure regulator 85 from a branch point between the front and rear banks BF and BR. The air pump 42 has its outlet port connected to the pressurizing air chambers 75 of the air injection valves 44 of the air-fuel mixture injection valves 40 of the front and rear banks BF and BR. The air pressure regulator 79F is connected between the air injection valve 44 and the air pump 42 of the front bank BF, and an air pressure regulator 79R is connected between the air injection valve 44 and the air pump 42 of the rear bank BR.

Figure 5:
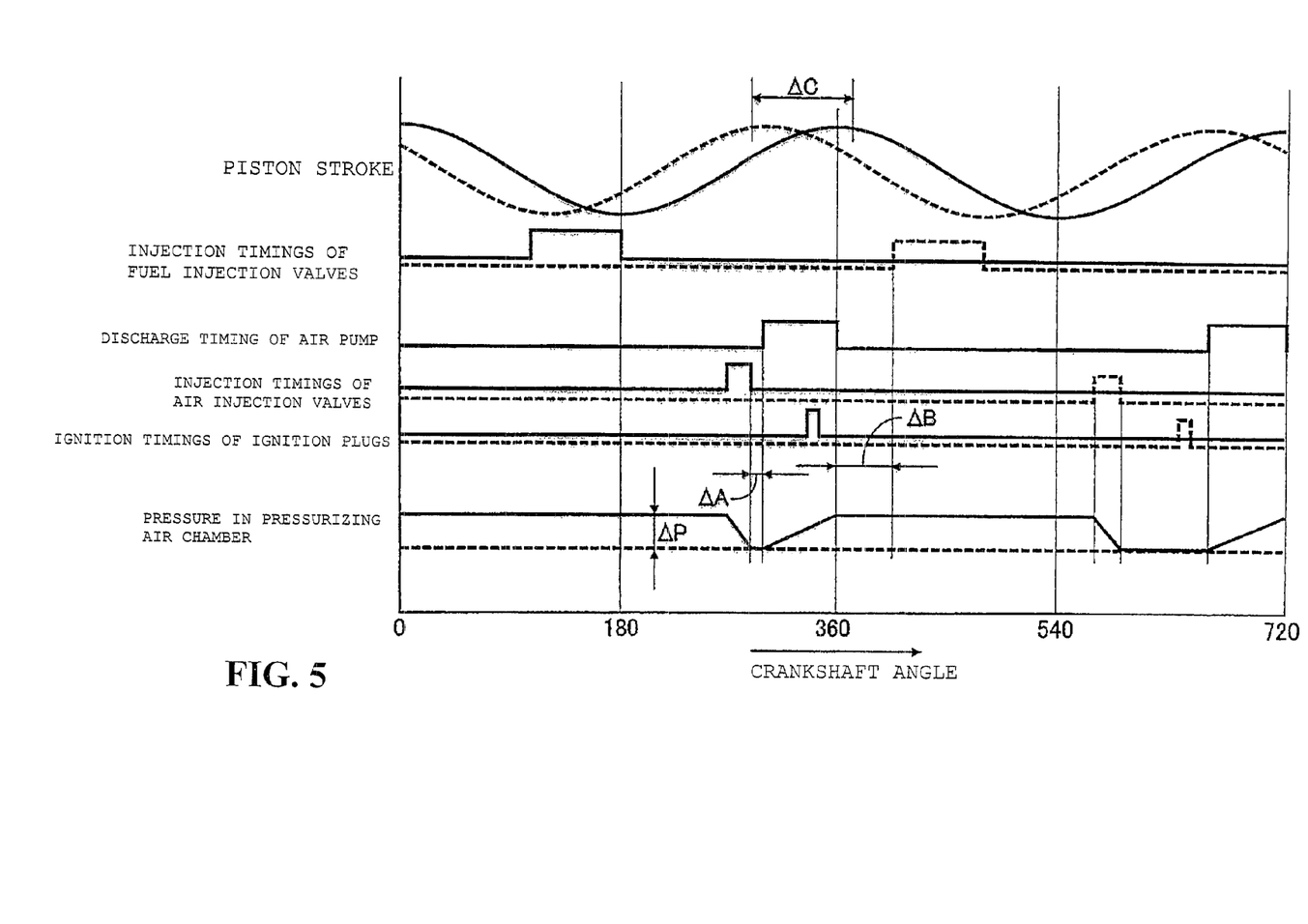
FIG. 5 is a timing chart showing piston stroke, the injection timings of fuel injection valves, the discharge timing of an air pump, the injection timings of air injection valves, ignition timings, and changes in the pressure in a pressurizing air chamber.

In the in-cylinder injection type multicylinder internal combustion engine which has the V-shaped two cylinders for uneven interval firing, the piston stroke, the injection timing of the fuel injection valves 43, the discharge timing of the air pump 42, the injection timing of the air injection valves 44, and the ignition timings are established as shown in FIG. 5, and the pressure in the pressurizing air chamber 75 changes accordingly as shown in FIG. 5. FIG. 5 shows various timings depending on changes in the crankshaft angle of one of the cylinders, e.g., the cylinder of the front bank BF. The piston stroke, the injection timing of the fuel injection valve 43, the discharge timing of the air pump 42, the injection timing of the air injection valve 44, and the ignition timing of the cylinder of the front bank BF are shown by the solid-line curves in FIG. 5, and the piston stroke, the injection timing of the fuel injection valve 43, the discharge timing of the air pump 42, the injection timing of the air injection valve 44, and the ignition timing of the cylinder of the rear bank BR are shown by the broken-line curves in FIG. 5.

According to the present invention, the discharge timing of the air pump 42 is set out of synchronism with the injection timings of the fuel injection valves 43 and the air injection valves 44, i.e., the air-fuel mixture injection valves 40, of all the cylinders.

More specifically, the discharge timing of the air pump 42 is set after the completion of the injection from the air injection valve 44 of the cylinder of the front bank BF and before the injection timing of the fuel injection valve 43 of the cylinder of the rear bank BR, and the time ΔA after the completion of the injection from the air injection valve 44 of the cylinder of the front bank BF until the air pump 42 starts to discharge the air is set to be shorter than the time ΔB after the completion of the discharge of the air pump 42 until the fuel injection valve 43 of the cylinder of the rear bank BR starts to inject the fuel.

The discharge timing of the air pump 42 is set in an interval ΔC between a time immediately before the top dead center in an exhaust stroke of the cylinder of the rear bank BR and a time immediately after the top dead center in a compression stroke of the cylinder of the front bank BF, and preferably in a latter part of the compression stroke of the cylinder of the front bank BF.

Advantages of Embodiment 1 will be described below. Since the air pump 42 discharges the compressed air out of synchronism with injection timings of the fuel injection valves 43 and the air injection valves 44 of the cylinders of the front and rear banks BF and BR, a change in the injection pressure of the fuel injection valves 43 and the air injection valves 44, which would be caused by a pressure change in the high-pressure air pipe system due to the discharge from the air pump 42, is prevented, giving a stable pressure environment to the air-fuel mixture injection valves 40 of the cylinders for good combustibility.

Since the discharge timing of the air pump 42 is set after the completion of the injection from the air injection valve 44 of one of the cylinders and before the injection timing of the fuel injection valve 43 of the other cylinder, no compressed air is discharged from the air pump 42 between the injection timings of the fuel injection valves 43 and the air injection valves 44 of the cylinders. Thus, a change in the injection pressure of the air-fuel mixture injection valves 40, which would be caused by a pressure change based on the discharge of the compressed air from the air pump 42, is effectively prevented for stable air-fuel mixture injection control.

Furthermore, since the time ΔA after the completion of the injection from the air injection valve 44 of the cylinder of the front bank BF until the air pump 42 starts to discharge the air is set to be shorter than the time ΔB after the completion of the discharge of the air pump 42 until the fuel injection valve 43 of the cylinder of the rear bank BR starts to inject the fuel, the time after the completion of the discharge of the air pump 42 until the injection timing of the fuel injection valve 43 of the cylinder of the rear bank BR may be increased to reduce a change in the injection pressure not only of the air injection valve 44 but also of the fuel injection valve 43 which serves as part of the air-fuel mixture injection valve 40. In addition, the range ΔP (see FIG. 5) in which the pressure of the pressurizing air chamber 75 changes can be reduced by alternately repeating the fuel injection and the air injection, and the discharge from the air pump 42.

Furthermore, inasmuch as the discharge timing of the air pump 42 is set in the interval ΔC between the time immediately before the top dead center in the exhaust stroke of the cylinder of the rear bank BR and the time immediately after the top dead center in the compression stroke of the cylinder of the front bank BF, the air pump 42 actuated by the power transmitted from the crankshaft discharges air in the compression stroke of the one of the cylinders, thereby further slowing the slow compression stroke under a load imposed by the discharge from the air pump 42. Rotational fluctuations are thus increased to emphasize the characteristics of the internal combustion engine for uneven interval firing, so that the riding feeling on a vehicle equipped with the internal combustion engine E is improved. Thus, the setting of the discharge timing of the air pump 42 in the latter part of the compression stroke of the one of the cylinders is more effective.

Figure 6:
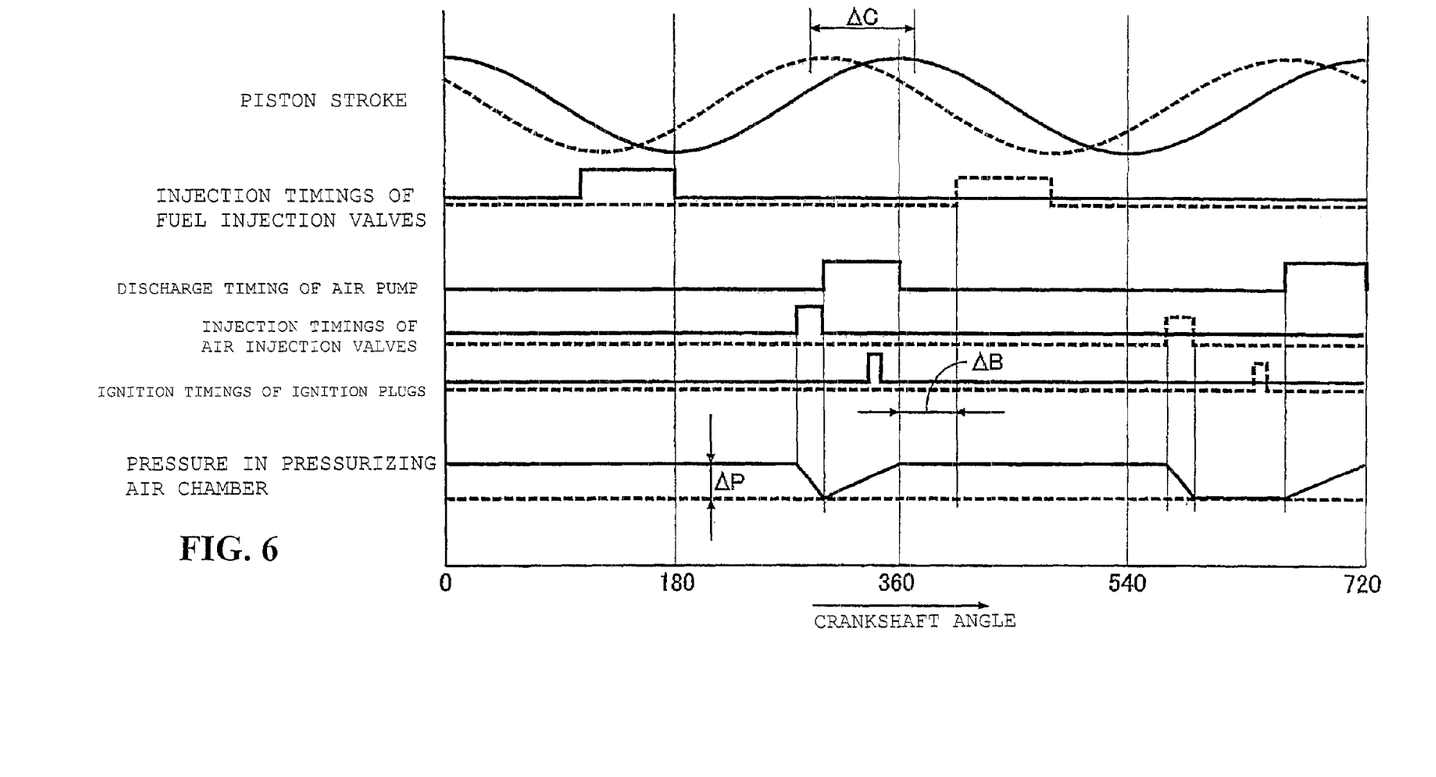
FIG. 6 is a timing chart corresponding to FIG. 5 according to Embodiment 2.

Embodiment 2 of the present invention will be described below with reference to FIG. 6. The discharge timing of the air pump 42 is set not only after the completion of the injection from the air injection valve 44 of the cylinder of the front bank BF and before the injection timing of the fuel injection valve 43 of the cylinder of the rear bank BR, but also immediately after the completion of the injection of the air injection valve 44 of the front bank BF.

According to Embodiment 2, the time from the completion of the discharge of the air pump 42 until the ignition timing of the fuel injection valve 43 of the cylinder of the rear bank BR is maximized for more effectively reducing a change in the injection pressure of the fuel injection valve 43.

While the embodiments of the present invention have been described above, the present invention is not limited to the above embodiments, but various changes of design may be made therein without departing from the scope of the claims for patent.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An in-cylinder injection, multicylinder internal combustion engine for uneven interval firing, comprising:
   a first cylinder and a second cylinder,
   a plurality of air-fuel mixture injection valves for directly injecting an air-fuel mixture into a combustion chamber of each of the first cylinder and the second cylinder, said air-fuel mixture injection valves being mounted on a multicylinder engine body, and each having a fuel injection valve for injecting fuel and an air injection valve for injecting a mixture of the fuel injected from the fuel injection valve and injection air; and
   an air pump actuatable by power transmitted from a crankshaft for discharging compressed air as said injection air, said air pump being operatively connected in common to said air-fuel mixture injection valves, and
   elapsed times between a discharge timing of said air pump and injection timings of the fuel injection valve and the air injection valve in the first cylinder are set to be different and to be out of synchronism from elapsed times between the discharge timing of said air pump and the injection timings of the fuel injection valve and the air injection valve of the second cylinder,
   wherein the discharge timing of said air pump is set to start after completion of an injection from the air injection valve of the first cylinder and before the injection timing of the fuel injection valve of the second cylinder,
   wherein a time duration ($\Delta A$) after the completion of the injection from the air injection valve of the first cylinder until the air pump starts to discharge the air is set to be shorter than a time duration ($\Delta B$) after the completion of the discharge timing of the air pump until the fuel injection valve of the second cylinder starts to inject the fuel,
   wherein each of the fuel injection valves joins a corresponding one of the air injection valves in a position surrounded by a cylinder head of the engine, and
   for each of the cylinders of the engine, the system further comprising:
   a damper member surrounding an end portion of the air injection valve while making no contact with the air injection valve,
   the damper member having a vibration damping capability for allowing vibration to occur in an axial direction between the end faces of the air injection valve and the corresponding fuel injection valve,
   the engine further comprising:
   an air filter arranged upstream of the air pump for purifying air drawn by the air pump,
   a first air pressure regulator is connected directly between the air filter and the air injection valve of the first cylinder, and
   a second air pressure regulator is directly connected between the air filter and the air injection valve of the second cylinder.

2. The in-cylinder injection multicylinder internal combustion engine according to claim 1, wherein the discharge timing of said air pump is set to start immediately after the completion of the injection from said air injection valve of the first cylinder.

3. The in-cylinder injection multicylinder internal combustion engine according to claim 1, wherein the discharge timing of said air pump is set to occur in an interval ($\Delta C$) between a time immediately before a top dead center in an exhaust stroke of the second cylinder and a time immediately after a top dead center in a compression stroke of the first cylinder.

4. The in-cylinder injection multicylinder internal combustion engine according to claim 1, wherein first cylinder is located on a front bank of the cylinders, and the second cylinder is located on a rear bank of the cylinders, and
   the discharge timing of said air pump is set to occur after the completion of the injection from said air injection valve of the first cylinder, and before the injection timing of the fuel injection valve of the second cylinder, and also after the completion of the injection from the air injection valve of the front bank.

5. An in-cylinder fuel and air injector system for use with a multicylinder internal combustion engine comprising:
   a first cylinder and a second cylinder,
   a plurality of fuel injection valves for injecting fuel;
   a plurality of air injection valves for injecting a mixture of the fuel injected from the fuel injection valves and injection air; and
   an air pump for discharging compressed air as said injection air, said air pump being operatively connected in common to said plurality of air injection valves, and
   elapsed times between a discharge timing of said air pump and injection timings of the fuel injection valve and the air injection valve in the first cylinder are set to be different and to be out of synchronism from elapsed times between the discharge timing of said air pump and the injection timings of the fuel injection valve and the air injection valve of the second cylinder,
   wherein each of the fuel injection valves joins a corresponding one of the air injection valves in a position surrounded by a cylinder head of the engine, and
   for each of the cylinders of the engine, the system further comprising:
   a damper member surrounding an end portion of the air injection valve while making no contact with the air injection valve,
   the damper member having a vibration damping capability for allowing vibration to occur in an axial direction between the end faces of the air injection valve and the corresponding fuel injection valve,
   the engine further comprising:
   an air filter arranged upstream of the air pump for purifying air drawn by the air pump,
   a first air pressure regulator is connected directly between the air filter and the air injection valve of the first cylinder, and
   a second air pressure regulator is connected directly between the air filter and the air injection valve of the second cylinder.

6. The in-cylinder fuel and air injector system according to claim 5, wherein the discharge timing of said air pump is set to start after completion of an injection of the air injection valve of the first cylinder and before the injection timing of the fuel injection valve of the second cylinder.

7. The in-cylinder fuel and air injector system according to claim 5, wherein a time duration (ΔA) after completion of the injection from the air injection valve of the first cylinder until the air pump starts to discharge the air is set to be shorter than a time duration (ΔB) after the completion of the discharge timing of the air pump until the fuel injection valve of the second cylinder starts to inject the fuel.

8. The in-cylinder fuel and air injector system according to claim 6, wherein the discharge timing of said air pump is set to start immediately after the completion of the injection from said air injection valve of the first cylinder.

9. The in-cylinder fuel and air injector system according to claim 7, wherein the discharge timing of said air pump is set to start immediately after the completion of the injection from the air injection valve of the first cylinder.

10. The in-cylinder fuel and air injector system according to claim 6, wherein the discharge timing of said air pump is set to occur in an interval (ΔC) between a time immediately before a top dead center in an exhaust stroke of the second cylinder and a time immediately after a top dead center in a compression stroke of the first cylinder.

11. The in-cylinder fuel and air injector system according to claim 7, wherein the discharge timing of said air pump is set to occur in an interval (ΔC) between a time immediately before a top dead center in an exhaust stroke of the second cylinder and a time immediately after a top dead center in a compression stroke of the first cylinder.

12. The in-cylinder fuel and air injector system according to claim 8, wherein the discharge timing of said air pump is set to occur in an interval (ΔC) between a time immediately before a top dead center in an exhaust stroke of the second cylinder and a time immediately after a top dead center in a compression stroke of the first cylinder.

13. The in-cylinder fuel and air injector system according to claim 5, wherein first cylinder is located on a front bank of the cylinders, and the second cylinder is located on a rear bank of the cylinders, and the discharge timing of said air pump is set to occur after completion of the injection from said air injection valve of the first cylinder, and before the injection timing of the fuel injection valve of the second cylinder, and also after the completion of the injection from the air injection valve of the front bank.

* * * * *